No. 672,975. Patented Apr. 30, 1901.
A. B. COLE.
SKIRT GUARD FOR VEHICLES.
(Application filed Mar. 13, 1901.)
(No Model.)
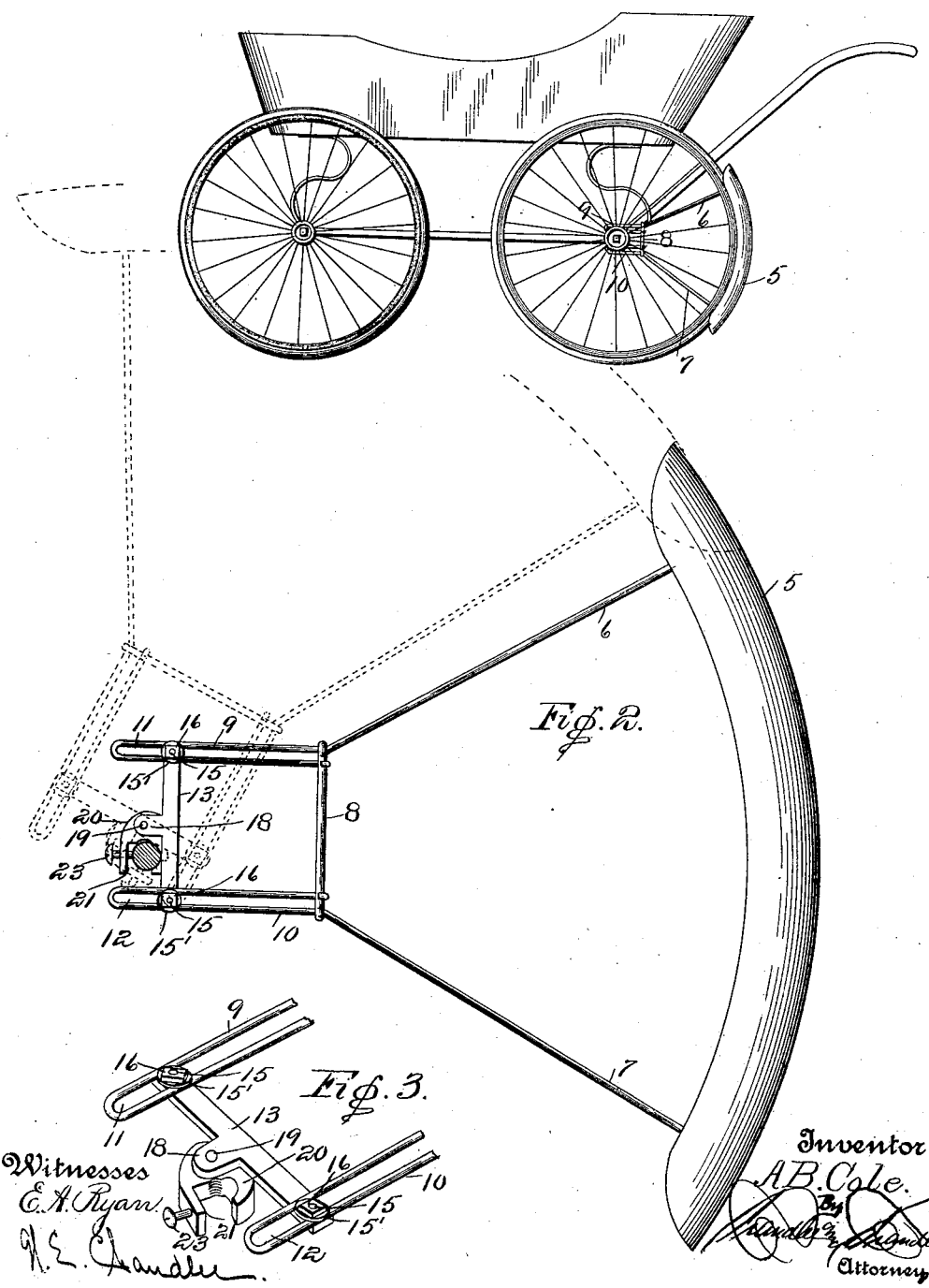

UNITED STATES PATENT OFFICE.

ALVA B. COLE, OF PETOSKEY, MICHIGAN.

SKIRT-GUARD FOR VEHICLES.

SPECIFICATION forming part of Letters Patent No. 672,975, dated April 30, 1901.

Application filed March 13, 1901. Serial No. 51,003. (No model.)

*To all whom it may concern:*

Be it known that I, ALVA BURNS COLE, a citizen of the United States, residing at Petoskey, in the county of Emmet, State of Michigan, have invented certain new and useful Improvements in Skirt-Guards; and I do hereby declare the following to be a full, clear, and exact description of the invention, such as will enable others skilled in the art to which it appertains to make and use the same.

This invention relates to mud-guards in general, and more particularly to guards adapted for attachment to baby-carriages and go-carts to prevent contact of the wheels of the vehicle with the skirts of the person pushing the vehicle, one object of the invention being to provide a cheap, simple, and efficient construction which may be readily attached to and detached from the axle of the vehicle and which may be adjusted to wheels of various diameters, a further object of the invention being to provide a construction in which the guard may have a degree of upward pivotal movement to prevent breaking of the parts in the event of the lower end of the guard striking upon a curb in taking the vehicle down the curb.

Further objects and advantages of the invention will be evident from the following description.

In the drawings forming a portion of this specification, and in which like numerals of reference indicate similar parts in the several views, Figure 1 is a side elevation showing a baby-carriage with the guard attached. Fig. 2 is a side elevation of the guard engaged with the axle of the carriage, the raised position of the guard being indicated in dotted lines. Fig. 3 is an enlarged detail perspective view showing the adjusting and attaching portion of the structure.

Referring now to the drawings, the guard consists of a transversely-dished and longitudinally-curved plate of arc shape (shown at 5) which is adapted to fit part way around the periphery of a wheel of a vehicle, so that the skirts of the person pushing the vehicle may not come in contact with the wheel, and this guard-plate is provided with a supporting-bracket. The supporting-bracket is in the form of a frame including diverging arms 6 and 7, attached at their outer ends to the plate 5 at one side and adjacent to the ends thereof. These arms are converged from the guard-plate for a suitable distance and are then bent to lie parallel, after which they are returned upon themselves and in a common plane, the extremities thereof being secured in any suitable manner to a cross bar or brace 8, which holds them rigidly against displacement.

The parallel portions of the arms above referred to and the portions bent upon themselves and shown at 9 and 10 form spaced loops 11 and 12, and disposed transversely of these loops is a plate 13, having perforated ends, through which are engaged bolts 15, having washers 15' thereon, which lie against the opposite faces of the loops from the plate 13 and are clamped thereagainst by means of nuts 16, which act to hold the plate firmly against sliding movement with respect to the loops.

At one side of the plate 13 is a lug 18, which is perforated to receive the pivot-bolt 19 for a block 20, having a recess 21 therein to receive the axle of the wheel to which the guard is to be applied, and after the axle is disposed within said recess a set-screw 23, engaged with said block, is screwed up to impinge the axle and hold the block thereon, this block being engaged from the upper side of the axle, so that the plate 13 may rest against the axle and prevent pivotal movement of the supporting-frame in a downward direction.

With this construction and arrangement it will be seen that the guard is free to move upwardly on the pivot of the attaching-block, but is prevented from dropping to touch the ground, while by means of the connections between the plate 13 and the supporting-frame said frame may be shifted with respect to the plate to move the guard-plate toward and away from the periphery of the vehicle-wheel or to adjust it to wheels of various diameters.

It is of course understood that a guard is adjusted to each of the rear wheels of the vehicle and that the attaching-blocks are engaged with the axle at the inner sides of the wheels.

In practice modifications of the specific construction shown may be made and any suitable materials and proportions may be used.

What is claimed is—

1. An adjustable guard for vehicle-wheels comprising a guard-plate and a supporting-frame said frame including spaced loops having arms attached to the plate, a second plate disposed transversely of the loops, clamping-bolts engaged with the second plate and with the loops to hold the plate adjustably thereto, and an attaching-block pivoted to the plate and adapted for attachment to the vehicle-axle.

2. A guard for vehicle-wheels comprising a guard-plate, a supporting-frame including arms attached to the plate and having their free ends bent upon themselves to form spaced parallel loops, a plate disposed transversely of the loops, clamping-bolts passed through the said plate and the loops and adapted to clamp the plate against the loops, said plate having a projection, and a slotted block pivoted to the projection, said block being adapted to receive a vehicle-axle in its slot, and having a set-screw to hold the axle against displacement therefrom.

In testimony whereof I hereunto sign my name, in the presence of two subscribing witnesses, on the 21st day of February, 1901.

ALVA B. COLE.

Witnesses:
EDWARD C. LABADIE,
CYRENUS CASE.